(12) United States Patent  (10) Patent No.: US 6,705,555 B1
Bratten                    (45) Date of Patent:    Mar. 16, 2004

(54) LIFT STATION AND METHOD FOR SHALLOW DEPTH LIQUID FLOWS

(76) Inventor: Jack R. Bratten, 5970 St. James Dr., West Bloomfield, MI (US) 48322

( * ) Notice: Subject to any disclaimer, the term of this patent is extended or adjusted under 35 U.S.C. 154(b) by 0 days.

(21) Appl. No.: 09/498,178

(22) Filed: Feb. 4, 2000

(51) Int. Cl.[7] .......................... B02C 13/00; B02C 13/04
(52) U.S. Cl. .................................................. 241/101.2
(58) Field of Search ...................................... 241/101.2

(56) References Cited

U.S. PATENT DOCUMENTS

| 3,934,499 A | * | 1/1976 | Strom ........................... 100/53 |
| 4,076,179 A | * | 2/1978 | Tsukube ................... 241/46.11 |
| 4,441,995 A | * | 4/1984 | Dudley ........................ 209/137 |
| 4,498,987 A | * | 2/1985 | Inaba ........................... 210/222 |
| 4,681,508 A | * | 7/1987 | Kim ............................. 415/116 |
| 4,854,820 A | * | 8/1989 | Zolotar et al. ........... 415/171.1 |
| 5,217,613 A | * | 6/1993 | Tashiro et al. .............. 210/396 |

* cited by examiner

Primary Examiner—William Hong
(74) Attorney, Agent, or Firm—John R. Benefiel

(57) ABSTRACT

A lift station and method for lifting liquid and chips flowing in a shallow stream trough to a higher level for further handling by rotation of a bladed wheel in a housing arranged to receive the liquid flow stream. The rotating blades cause the liquid to be swept up a forward housing wall and to be slung off the blades into an upwardly and backwardly extending exit chute, having sufficient momentum to reach and pass over a weir edge at the upper end of the chute, the liquid then directed into a collection tank where it may accumulate to a much greater depth than the depth of the flow stream.

14 Claims, 3 Drawing Sheets

LIFT STATION AND METHOD FOR SHALLOW DEPTH LIQUID FLOWS

BACKGROUND OF THE INVENTION

This invention concerns equipment and methods for circulating liquids generated in industrial processing, such as the cutting fluids used in machine tools during the machining of parts.

In the large scale production of machined parts, such as automotive engine parts, it is a common practice to arrange a series of machine tools along a transfer line, with parts transferred down the line for step by step completion of the necessary machining operations on the parts. Cutting fluid is directed at the tools doing the cutting of metal for cooling, lubrication, and to carry off the chips and other debris generated by the machining of the part. The cutting fluid drains down from each machine tool, carrying the chips and other debris with it into a collection trench. The collected cutting fluid liquid moves down the trench carrying the chips, etc. to a sump, from which the mixture is pumped and directed to filtration equipment for removal of the contaminants, and then recirculated to the machine tools for reuse In the past, below grade trenches were commonly used, with sloping trench bottoms causing gravity flow of the collected liquid and entrained chips down the length of the trench, the flow sometimes assisted with pumped jets of liquid.

In recent years, below grade trenches have become disfavored due to the cost of excavating and lining the trenches with metal plates, as well as the difficulties encountered when a reconfiguration of a plant floor plan becomes necessary, and also because of the potential for hard-to-detect leaks occurring, possibly contaminating the soil beneath the plant.

Above grade troughs have thus been recently adopted, as for example, as shown in U.S. Pat. No. 5,980,735, issued to the present inventor.

The manufacturers wish to avoid raising the machine tools above normal working heights so that plant personnel do not have to climb onto raised platforms to replace tools or perform maintenance.

These constraints impose certain limitations on the collection trough system as there is only limited above grade vertical space available beneath the machines, and typically liquid drains from a number of machines into a common trough. A sufficient flow rate must be maintained to carry the chips and other debris down the trough, and this also limits the height of the trough bottom and the depth of liquid at the downstream end as there must be adequate slope to achieve the flow velocity required to carry off the chips. The result is a quite shallow depth stream of liquid flow at the downstream end of the trough.

It is difficult to reliably pump out liquid and chips from a shallow stream of liquid, as pumps will lose prime as the depth of flow at the trough end and rises and falls. It is critical that the flow be constant, as even momentary back ups will cause the chips carried by the flow stream to pile up, and if too many chips pile up, these will not be carried away when the flow resumes.

Such machine tool systems operate continuously for many hours or days at a time while producing a sporadic volume of collected liquid, and as it is impractical for most pumps to run dry, starting and stopping the pumps would be necessary, aggravating any tendency for a pump to lose prime.

One possible approach to this problem is to draw out the liquid and chips with a vacuum suction created by a draw tube connected to a vacuum tank, as described in applicant's prior U.S. Pat. Nos. 5,593,596 and 5,466,380, which also shows providing individual sumps at each machine tool.

This approach is effective for moderate flow volume systems, but for high volume installations, i.e., those generating volumes on the order of 1000 g.p.m., the piping and tank sizes become impractically large. Furthermore, there are difficulties in maintaining a sufficient vacuum in a large tank where air may periodically be vented into the tank without sometimes developing vacuums too low to maintain evacuation of the sumps.

Another approach would be to provide a below grade gravity collection sump at the downstream end of the trough, but as noted, below grade pits are undesirable, and chips and other solids tend to settle out in such pits, requiring periodic maintenance.

It is the object of the present invention to provide a lift station and method which is capable of very reliably handling such shallow depth varying volume liquid flow streams carrying debris, without the occurrence of even momentary stoppages of the flow stream.

SUMMARY OF THE INVENTION

The above object as well as others which will become apparent upon a reading of the following specification and claims, are achieved by arranging a lift station comprised of a bladed wheel in a housing at the downstream end of the collection trough. The housing is connected to the trough end so as to receive the flow stream into an inlet opening, and passes it into a slightly downwardly inclined surface defined by the inside of a housing bottom wall. The bladed wheel is oriented so that its outwardly extending blades are shaped in conformity to the housing section, and sweep down the inclined surface in the same direction as that of the flow stream, tending to sweep the incoming liquid and debris down the inclined surface. The housing bottom wall blends into to a curving perimeter wall at the rear of the housing which extends upwardly and towards a reversely inclined exit chute. The bladed wheel is rotated with sufficient speed such that the liquid swept along with the blades is slung out from the blades and into the exit chute with sufficient velocity so that the liquid has enough momentum to reach and pass over a weir edge at the upper end of the exit chute. The blades are preferably raked back tangentially to insure that the liquid is not captured by the blades and is readily slung out as the blades rotate over the top of the wheel hub.

Any liquid which does not reach the weir edge flows back downwardly onto a surface defined by a housing front wall which has a forwardly extending bottom lip which redirects the liquid flow in the same direction as that of the incoming flow stream to again be directed upwardly as the wheel blades carry the liquid around again. This additional momentum in a forward direction insures that a velocity of the redirected liquid will be achieved sufficient to reach the weir edge.

The liquid flowing over the weir edge flows into an outlet chute and thence into a collection tank, able to be filled to a level such that it can easily be pumped to a filtration apparatus. A chip shredder/conveyor can be mounted in the outlet chute to reduce the chip size for easier subsequent handling.

As noted, the blades are preferably mounted to extend tangentially back from the direction of rotation to improve lifting performance, but this also will allow deflection if solid objects are dropped into the liquid flow and reach the bladed wheel, and these objects thus can be accommodated without breakage of the blades or stoppage of the wheel.

Several of the bladed wheel and housing devices can be used to lift liquid flows through successive inclined trough sections extending over the same level.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
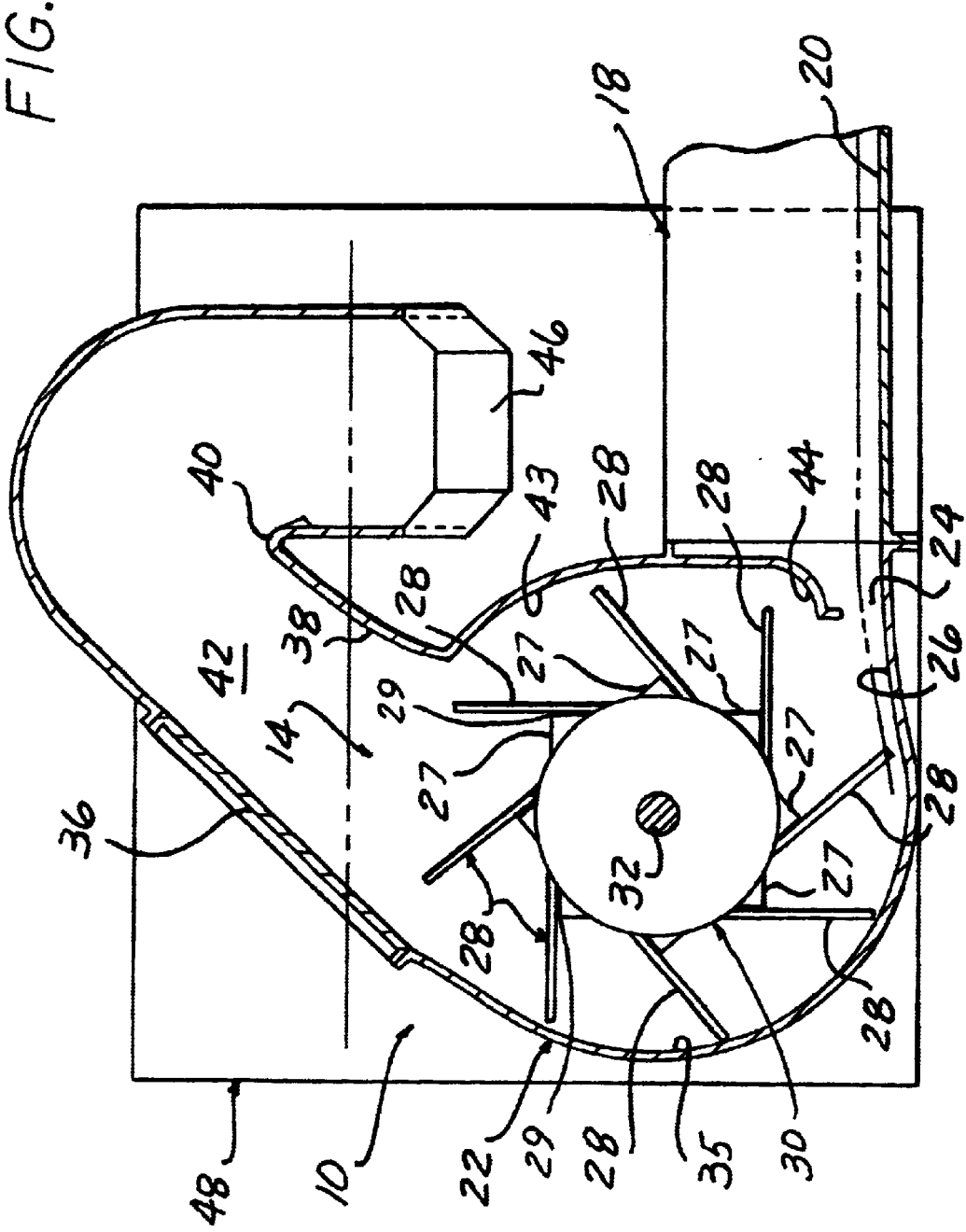
FIG. 1 is a side view in partial section of a liquid lift station including a bladed wheel and housing, together with a fragmentary portion of an associated trough, and a collecting tank.
Figure 2:
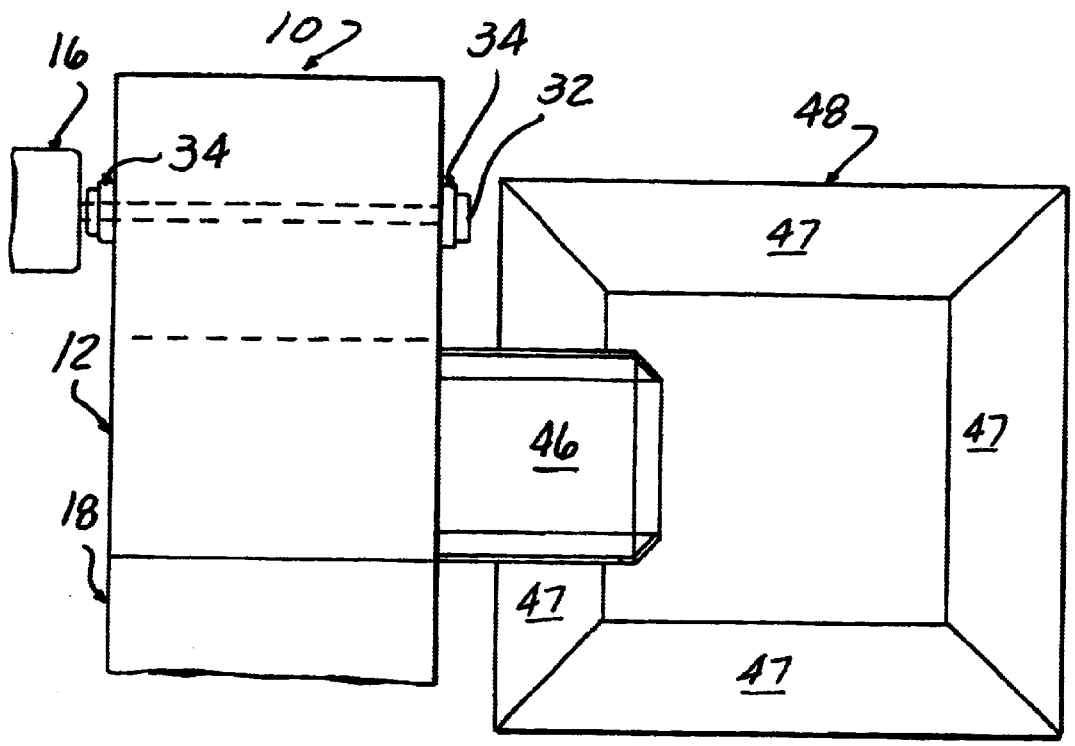
FIG. 2 is a plan view of the apparatus of FIG. 1.
Figure 3:
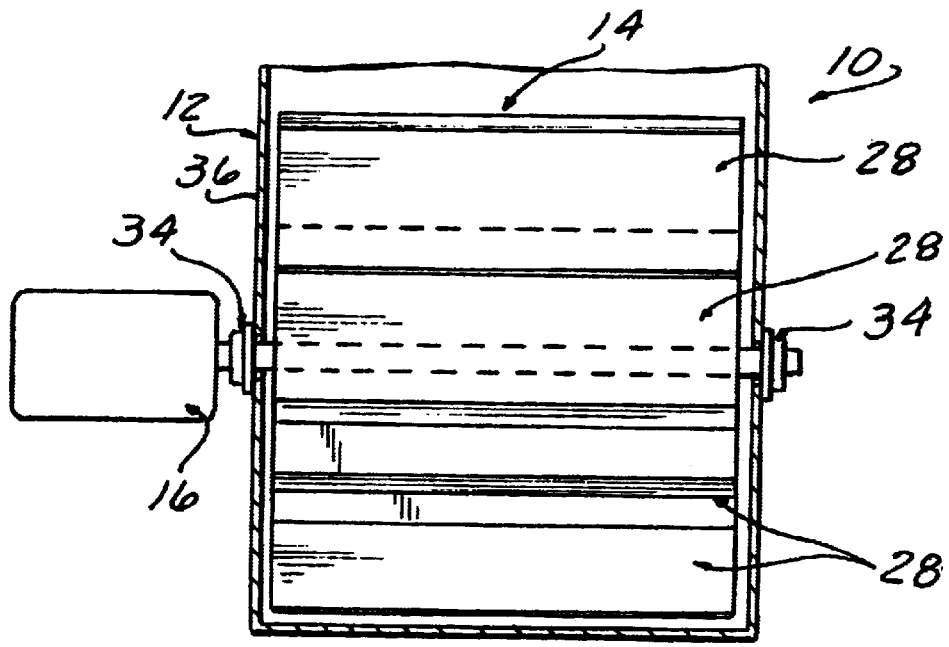
FIG. 3 is a front view of the bladed wheel and housing shown in FIGS. 1 and 2.

Referring to the Drawings, and particularly FIGS. 1–3, the liquid lift station 10 according to the present invention includes a housing 12 and a bladed wheel 14 rotatably mounted therein, driven by a motor 16 (FIGS. 2, 3).

The downstream end of a gravity trough 18 having a downwardly sloping bottom 20 is connected to an inlet flange 22 at the right side of the housing 12.

The housing 12 has an inlet opening 24 receiving liquid and entrained chips flowing in a shallow depth stream down the length of the trough 18, typically only a few inches deep.

The bottom wall 26 of the housing 12 is also inclined downwardly to keep the liquid flowing into the housing interior, where a series of blades 28 are mounted to a hub here comprised of a drum 30 fixed on a rotatable axle shaft 32, supported by bearing caps 34 fixed to sidewalls 36 of the housing 12.

The blades 28 are welded or bolted to angle pieces 27 welded to the drum 30, optionally having interposed resilient sheets 29 in order to allow deflection when a large object enters the housing 12. The blades 28 may be constructed of ¼ inch thick sheet steel to be substantially rigid. Alternatively, thinner gauge spring steel or blue steel material can be used which will be deflectable without the interposed resilient sheets 29 to achieve the same result.

The blades 28 extends outwardly from the drum 30, in a direction tangential to the axis of rotation defined by the axle 32, and in a direction opposite to the direction of rotation, i.e., are backwardly raked to be oriented in a trailing direction. The backward rake of the blades 28 is believed to assist in obtaining improved upward slinging of the liquid and chips from the blades 28 as they accelerate the liquid by the development of centrifugal force to velocity sufficient to reach a wear edge 42.

Since there is an inherent unequal distribution of liquid being moved by the various blades, it has been found that reasonably smooth rotation is achieved by a set of eight blades as shown, although fewer or more could be used.

The blades 28 are shaped in close conformity to the cross sectional shape and size of the housing 12, i.e., in this embodiment the blades are rectangular as seen in FIG. 3 about 24 inches wide, with only minimal edge clearances, i.e., on the order of ⅛th of an inch between the sides and ends and the adjacent trough walls. The cross sectional shape of the housing 12 in turn is matched to that of the trough 18.

Collection troughs 18 which underlie a series of machine tools (FIG. 4) are typically square or rectangular in cross sectional shape due to the lack of available clearance in order to maximize flow area. Where space is not so limited, as in below grade trenches, or in other above grade trough applications, a radiused bottom shape is employed to reduce frictional losses. The housing 12 and the blades 28 could be shaped in conformity accordingly.

The housing 12 curves upwardly from the bottom wall 26 to a radiused rear wall 35, extending above the level of the shaft 32, which extends into an upwardly and backwardly extending segment 36 (which can also comprise an access panel). The inner surface of the wall 35 follows the path of the outer edges of the blades 28 as the wheel 14 rotates.

The panel segment 36 and an opposite segment 38 define an exit chute 42 extending to a weir edge 40 over which liquid and chips are slung by rotation of the blades 28, weir edge 40 at a height well above the level of the trough bottom 20 and housing bottom 26.

The present inventor has discovered that the backward inclination of the outlet chute 42 extending back towards the front of the housing 12 is necessary to be generally aligned with the direction that the liquid is thrown off the blades 28 by rotation of the bladed drum 30, as a forward inclination defeats upward flow of the liquid even with increased rotational speed. That is, liquid will be thrown backwardly when coming off the blades 28.

A certain minimum speed is necessary greater than the velocity of the flow stream, depending on the lift height required, an outer edge speed of 12–15 feet per second having been found to be sufficient for the application described.

The rotating trailing blades 28 overtake the liquid flowing in from the trough 18 and down the inclined housing bottom 26, and sweeps the liquid forward. This is accomplished without even any momentary interruption up of the liquid flow, and chip in the trough 18 which could cause the chips to settle out and pile up, causing a rapid build up which might not be cleared away when flow resumes.

Initially, the inertia of the liquid causes it to be moved inward along the blade forward surface, i.e., radially inwardly. To limit the extent of this radially inward flow, a large diameter drum 30 is desirable rather than a small diameter shaft. As the liquid captured by the blade 28 is accelerated, centrifugal force subsequently causes radially outward movement of the liquid at an increasing velocity until achieving sufficient outward momentum so as to be slung from the blade 28 in the approximate direction in which the chute 42 extends, i.e., opposite the direction of inflow of liquid into the housing 12, passing over the weir edge 40. The trailing orientation of the blades 28 is believed to assist in slinging of the liquid and chips off the blades 28 in an upward direction.

A forward housing wall 43 extends downwardly and then curves forwardly at its terminal lip 44.

Any thrown liquid which does not reach and pass over the weir edge 40 drains down the forward wall 42 and is redirected towards the direction of the stream inflow by the lip 44, with momentum added in the forward direction of rotation of the blades 28, such as to be more likely to achieve sufficient upward momentum when again thrown off the blades 28 so as to reach the weir edge 40.

Liquid passing over the weir edge 40 enters a collection chute 46 extending at right angles to be directed into a collection tank 48 disposed along sides. The tank 48 has inclined bottom walls 47 as shown in FIG. 2 to eliminate dead zones which would rapidly fill with settled out chips.

Figure 4:
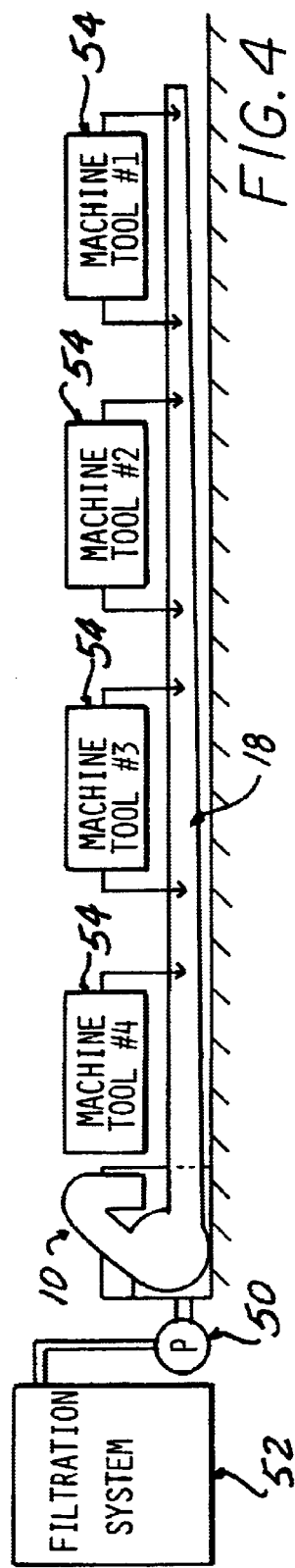
FIG. 4 is a diagrammatic side view of the liquid lift station of FIG. 1 with other associated machine tool and filtration equipment.

The liquid and chips can be pumped out of the collection tank 48 with a conventional pump 50 as to a filtration system 52 (FIG. 4). FIG. 4 shows diagrammatically a series of machine tools 54 with a trough 18 collecting cutting fluids and chips draining from each machine tool 54.

Figure 5:
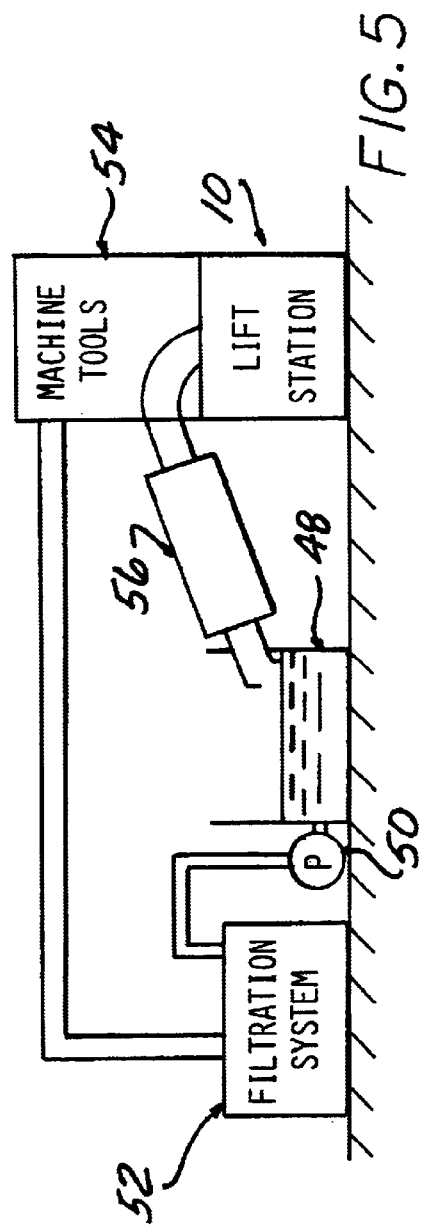
FIG. 5 is a diagrammatic view of the lift station of FIG. 1 with an optional chip shredder/conveyor.

As seen in FIG. 5, a chip conveyor/shredder 56 can be mounted in the discharge chute 46 so that large chips can be reduced to small size for easier pumping by pump 52.

Figure 6:
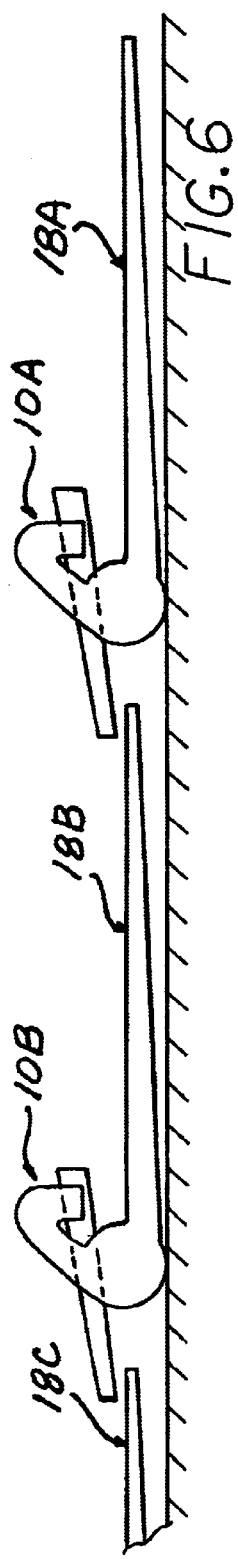
FIG. 6 is a diagrammatic view of a series of troughs arranged together with a liquid lift device according to the invention installed at the downstream end of each trough.

Another application of the lift device 10 is shown in FIG. 6, in which a series of troughs 18A, 18B, 18C are arranged end to end, with lift devices 10A, 10B arranged to lift the liquid and to discharge the same into the next downstream trough 18.

The lift station bladed wheel can be left running continuously and will instantly resume its lift action whenever liquid flows occur. There will be no start up problems nor any need to regain "prime" as with conventional pumps.

What is claimed is:

1. A lift station for lifting liquid from an open channel flow of liquid, said lift station comprising:

a housing having an inlet opening arranged to receive said open channel flow of liquid onto a bottom wall of said housing so that open channel flow continues into said housing;

a bladed wheel mounted within said housing for rotation about an axis located above said inlet opening, and a drive motor for rotating said bladed wheel therein;

said bladed wheel having a plurality of outwardly extending blades attached to a hub structure, said blades generally conforming to the cross sectional shape of an interior shape in said housing receiving said open channel liquid flow and rotated in the same direction of the direction of said flow, said blades each having an outer edge passing over said bottom wall during rotation of said bladed wheel and sweeping said open channel liquid flow entering said inlet opening in said same direction as said direction of said open channel flow;

said housing interior space defined by a rear wall surface curving upwardly from said inlet opening along the path along which said outer edge of each of said blades move so as to enable liquid to be swept therealong and upwardly by rotation of said bladed wheel;

said upwardly curving surface extending to a rearwardly and upwardly extending exit chute having a weir edge defined at an upper region thereof, liquid slung over said weir edge descending into a collection space disposed below and past said weir edge; said bladed wheel rotated by said drive motor to achieve sufficient blade velocity to sweep liquid upwardly and to sling said liquid up said exit chute and over said weir edge, said liquid thereafter descending into said collection space.

2. The lift station according to claim 1 wherein said housing bottom wall is inclined downwardly from said inlet opening in the direction of movement of outer edges of each of said blades.

3. The lift station according to claim 1 wherein said blades are inclined to be trailing the direction of rotation so as to be more easily deflected when encountering a solid object.

4. The lift station according to claim 3 wherein said blades extend in a tangential direction from said hub.

5. The lift station according to claim 1 wherein said housing further includes a return surface disposed below said exit chute, curving downwardly and back towards the direction of rotation of said blades to redirect any liquid not reaching said weir edge to flow in the direction of rotation of said bladed wheel.

6. The lift station according to claim 1 wherein said hub structure comprises a drum, said blades attached to the perimeter thereof extending in a tangential direction.

7. The lift station according to claim 1 wherein said blades are resiliently deflectable to accommodate large objects in said liquid flow.

8. The lift station according to claim 7 wherein said blades are attached with an intervening resilient pad to allow said deflection thereof.

9. The lift station according to claim 1 further including a sloping discharge chute located below said weir edge to receive liquid passing over said weir edge, and to collect and redirect the same to said collection space.

10. The lift station according to claim 9 further including filtration apparatus and a pump connected to said collection vessel circulating liquid therein to said filtration apparatus.

11. The lift station according to claim 10 further including a chip shredder/conveyor disposed in said discharge chute for reducing the size of debris in said chute and conveying the same into said collection space.

12. In combination with a machine tool installation comprised of a series of machine tools and a collection trough extending beneath said machine tools to receive liquid draining therefrom and an open channel flow of liquid therein, a lift station comprising:

a housing having an inlet opening at the bottom thereof connected to said collection trough to receive said open channel flow of liquid onto a bottom wall of said housing to continue said open channel flow of liquid into said housing;

a bladed wheel mounted within said housing for rotation about an axis above said inlet opening, and a drive motor for rotating said bladed wheel therein;

said bladed wheel having a plurality of tangentially extending blades attached to a hub structure, said blades generally conforming to the cross sectional shape of an interior space in said housing receiving said open channel flow of liquid and rotated in the same direction of said flow, said blades each having an outer edge passing over said bottom surface and sweeping said liquid in said therealong;

said housing interior space defined by a wall surface curving upwardly along the path which said outer edges of each of said blades move so as to enable liquid to be swept therealong and upwardly by rotation of said bladed wheel;

said upwardly curving surface extending to a rearwardly and upwardly extending exit chute having a weir edge defined at an upper region thereof, liquid thrown off said blades and slung over said weir edge descending into a holding space connected to said exit chute; said bladed wheel rotated by said drive motor to achieve sufficient blade velocity to throw liquid upwardly into said exit chute and over said weir edge.

13. A method of raising the level of liquid in an open channel flow of liquid flowing down an inclined bottom collection trough extending beneath a machine tool installation to collect draining cutting fluid and entrained chips to form an open channel liquid flow stream within said collection trough, comprising the steps of:

guiding said open channel liquid stream in said collection trough into a housing having a bottom surface configured to receive said flowing liquid stream;

successively sweeping each of a plurality of blades into said flowing liquid stream to sweep liquid and chips along said housing bottom surface and up an upwardly curving wall surface into an exit chute extending back in a reverse direction from said flowing liquid stream, and over a weir edge located in said exit chute; and, collecting said liquid and chips passing over said weir edge in a collection tank.

14. The method of claim 13 wherein said blades are oriented tangentially with respect to a rotational axis and rotated with sufficient velocity to cause liquid and chips to be thrown off said blades and back upwardly through said exit chute and over said weir edge.

* * * * *

UNITED STATES PATENT AND TRADEMARK OFFICE
CERTIFICATE OF CORRECTION

PATENT NO. : 6,705,555 B1
DATED : March 16, 2004
INVENTOR(S) : Jack R. Bratten

It is certified that error appears in the above-identified patent and that said Letters Patent is hereby corrected as shown below:

Column 1,
Line 23, after "reuse" insert -- . --.

Column 2,
Line 5, delete "shows providing" and insert therefor -- show --.

Column 4,
Line 42, after "is necessary" insert -- , --.
Line 51, after "flow" delete ", and chip".

Column 5,
Line 45, delete "shape" and insert therefor --space --.

Signed and Sealed this

Thirty-first Day of August, 2004

JON W. DUDAS
*Director of the United States Patent and Trademark Office*